3,214,200
TUBE COUPLING HAVING DEFORMING MEANS
Maurice A. Carlson, Los Altos, and William R. Wheeler, Saratoga, Calif., assignors to Varian Associates, Palo Alto, Calif., a corporation of California
Filed Sept. 5, 1963, Ser. No. 306,757
5 Claims. (Cl. 285—323)

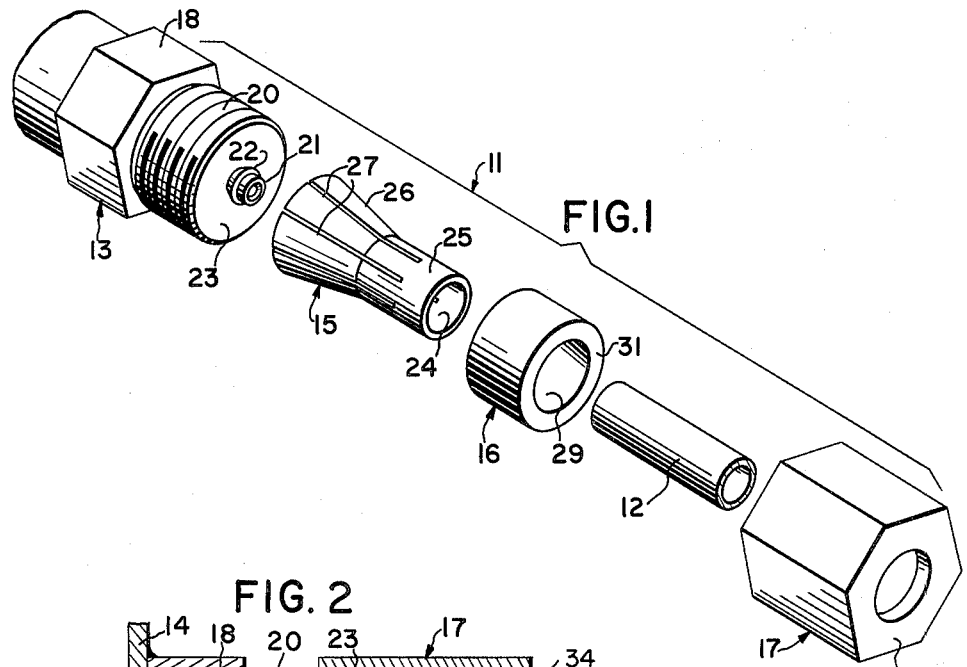
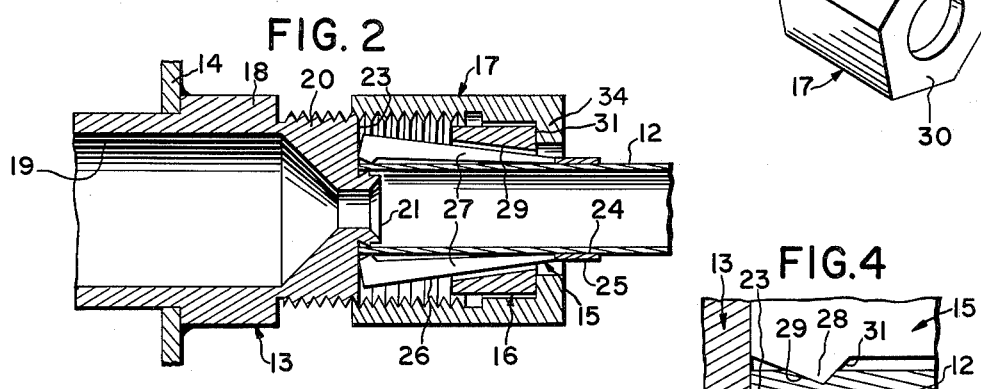
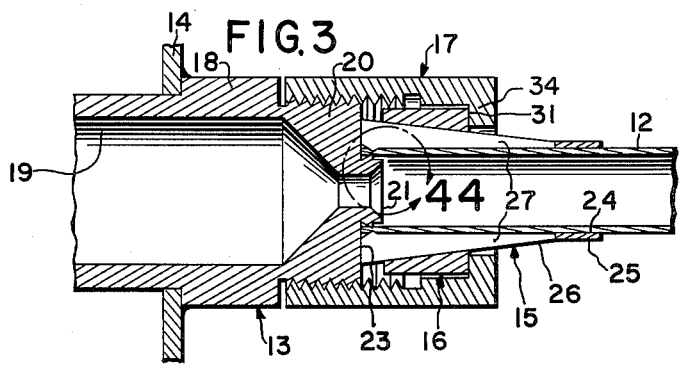
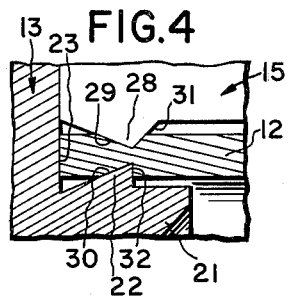
Oct. 26, 1965  M. A. CARLSON ET AL  3,214,200
TUBE COUPLING HAVING DEFORMING MEANS
Filed Sept. 5, 1963
INVENTORS
MAURICE A. CARLSON
WILLIAM R. WHEELER
BY  Wm. P. Nolan
ATTORNEY

This invention relates in general to coupling devices and particularly to a novel coupling assembly useful, for example, as an exhaust port coupling.

In many vacuum applications there is need for a coupling assembly which can quickly and easily couple two members together and also create a bakable high vacuum seal between the two members. One such application would be, for example, a compression port used to connect electronic vacuum tubes and the like to vacuum processing stations. In the past, however, such assemblies have been the source of air leaks into the vacuum system at high temperatures, as for example, during bakeout. In old coupling assemblies tubing often had to be flared at its end and a coupling nut placed on the tubing before the end was flared. Normally, too, when the assembly was being tightened, one or more parts became deformed, so that some, if not all, of the parts of the assembly could be used only once. In addition, a great deal of force was required to tighten the assembly, thus calling for an additional tool, i.e. a torque wrench. Not infrequently too much torque was applied causing the operator to sever the connecting conduit and thus destroy the seal.

Accordingly, it is the object of the present invention to provide a novel coupling assembly suited for use, for example, as an exhaust port coupling which in addition to overcoming the above mentioned difficulties of the prior art assemblies, can withstand repeated bakeout to temperatures above 500° C., is constructed completely of reusable parts, and requires a minimum of torquing to create a high vacuum seal, without the use of additional tools.

One feature of the present invention is the provision of a coupling assembly for coupling a tube to a body member which includes a novel slotted collet for receiving the tube, having a ridge portion on its inner periphery which cooperates with a ridge portion on a centrally projecting part of a nipple on the body member and a shoulder portion of the nipple to form a compartment for trapping the end of the tube upon radial compression of the collet.

Another feature of the present invention is the provision of a coupling assembly of the above type wherein the ridge portions are triangular in cross section.

Still another feature of the present invention is the provision of a coupling assembly of either of the above types wherein the ridge portions have a slanted side opposite the nipple shoulder portion, forming an angle between 55°–75° with the nipple shoulder portion.

A further feature of the present invention is the provision of a coupling assembly of any of the above types wherein the ridge portion on the collet has a second slanted side to permit easy removal of the collet during disassembly.

These and other features and objects of the present invention and a further understanding may be had by referring to the following description and claims, taken in conjunction with the following drawing in which:

FIG. 1 is an exploded perspective view of the novel coupling assembly of the present invention;

FIG. 2 is a fragmentary cross sectional view of the coupling assembly before tightening;

FIG. 3 is a fragmentary cross sectional view of the coupling assembly after assembly; and, FIG. 4 is an enlarged cross sectional view of the area delineated by 4—4 of FIG. 3.

Referring to FIGS. 1–3 of the drawing, a novel coupling assembly 11 of the present invention is shown as utilized in coupling a tube 12 of, for example, copper, to a body member 13. This body member 13 may, for example, be welded onto a component 14 of a vacuum system or may itself represent the body of a component of a vacuum system. The coupling assembly 11 comprises the body member 13, a collet 15, a clamping ring 16 and an apertured cap element 17. These members may be made of stainless steel and the like.

The body member 13 is of generally cylindrical shape, with a central hexagonal collar 18, and an exhaust bore 19 running through it. An externally threaded nipple 20 extending axially from the body member 13 has a central projecting part 21 with a ridge portion 22 (to be more fully described hereafter) on its outer periphery. In assembly, the tube 12 to be coupled is seated against the shoulder portion 23 of the nipple 20 with the central projecting part 21 extending into the end of the tube 12. The other end of the tube (not shown) is connected, for example, to a vacuum tube cavity that is to be evacuated or to any other component of a vacuum system.

The collet 15 has a bore 24 adapted to receive the tube 12 and comprises an annular body 25 whose outer surface slopes gradually from its mid-point to that end which in assembly abuts against the shoulder portion 23 of the nipple 20. This gradual incline provides a tapered surface 26 for cooperation with the clamping ring 16 to be described hereafter. The tapered portion 26 of the collet 15 is provided with slots 27 at annularly spaced intervals thereabout. In the drawing 6 slots are shown, although increasing the number affords more flexibility. The fact that the collet 15 is slotted permits it to contract radially during assembly. The collet 15 is provided with a ridge portion 28 (to be more fully described) on its inner surface, which in assembly cooperates with the ridge portion 22 of centrally projecting part 21 and shoulder portion 23 to form a compartment for trapping the end of the tube 12 and thereby create a vacuum tight bakable seal.

The clamping ring 16 is of generally cylindrical shape, and inclines gradually on its inner surface, thus providing a tapered surface 29 for cooperation with the tapered portion 26 of the outer surface of the collet 15. The cap element 17 is inwardly threaded for screw mounting on the nipple 20 of the body member 13 and is apertured through its end to receive the tube 12. A radially extending flange portion 34 is adapted to bear against the outer surface 31 of the clamping ring 16 as the cap element 17 is advanced along the nipple 20.

As shown more clearly in FIG. 4, the ridge portions 22, 28 have a triangular cross section. The ridge portions 22, 28 each have one slanted side 29, 30 while ridge portion 28 has a second slanted side 31 to allow for easy removal of the collet 15 during disassembly and the ridge portion 22 has a straight side 32.

In assembly, the collet 15 is first slipped over the central projecting part 21 in abutting relationship to the shoulder portion 23, the clamping ring 16 is slipped over the collet 15 and the cap element 17 is then screwed a few turns onto the nipple 20. The tube 12 which is to be connected to the body member 13 is inserted through the cap element 17, clamping ring 16 and collet 15, and seated against the shoulder portion 23. The cap element 17 is then tightened.

The cap element 17 moves towards collar 18 as a result of the rotation causing the flange portion 34 of the cap element 17 to bear against the outer surface 31 of the clamping ring 16. The inner tapered surface 29 of the clamping ring 16 slides along the tapered portion 26 of the outer surface of the collet 15 to effect radial compression of the collet 15.

The relative movement approximately perpendicular to the axis of the coupling assembly 11 between ridge portions 22, 28 causes compression of the end of the tube 12 by their slanted sides 30, 29. A normal force proportional to the total force applied by torquing the cap element 17 then exists at the slanted sides 30, 29. The normal force has a component which is parallel to the direction of relative movement and a component which is perpendicular to this direction of relative movement. However, the metal end of the tube 12 is restricted from moving in the direction of relative movement by the slanted sides 30, 29 of the opposing ridge portions 22, 28 and is restricted from moving in the direction perpendicular to the direction of relative movement by the shoulder portion 23.

Thus, the slanted sides 30, 29 and shoulder portion 23 form a compartment which traps the soft tube material. The trapping of the tube material results in the attainment and maintenance of extremely high pressure at the interface between the tube 12 and slanted sides 30, 29 thereby forming a truly intimate fit.

The preferable size of the angle which the slanted sides 30, 29 make with the direction of relative movement has been found to be in the range between 55° and 75° inclusive. It appears that the amount of pressure which can be maintained between the end of the tube 12 and the slanted sides 30, 29 for a given applied force is dependent on the angle. This pressure is in a maximum range for angles between 55° and 75° with an apparent absolute maximum of around 70°.

There are other advantages in utilizing an angle between 55° and 75°. For example, as the angle becomes exceedingly large, the trapping ability of the slanted side is lessened with the tube material having a greater freedom of movement in a direction away from the shoulder portion 23. The assembly has the further advantage that there is a single sealing point between tube and body member. Ideally, with a high vacuum seal device there is but one sealing point between the two members to be joined. This simplifies testing for leaks and it avoids virtual leaks.

A coupling assembly as described above was constructed and was found to require only two foot-pounds of torquing to create a high vacuum seal with soft copper tubulation and, but four foot-pounds of torquing with hard copper tubulation. Moreover the assembly was able to withstand repeated bakeouts to temperatures above 500° C.

Although the invention has been described in its preferred form with a certain degree of particularity, it is understood that the present disclosure of the preferred form has been made only by way of example and that numerous changes of the detail of construction and the combination and arrangement of parts may be resorted to without departing from the spirit and the scope of the invention as is hereinafter claimed.

What is claimed is:

1. A vacuum type coupling assembly for coupling a tube to a body member comprising: a tubular body member including a hollow nipple, and an exhaust bore running therethrough; a hollow end portion substantially coaxial with and projecting from said nipple, said end portion being of less outside diameter than said nipple whereby an annular shoulder portion surrounding said end portion is provided on said nipple against which said tube may seat, said end portion also being provided with an annular radial ridge projecting outwardly from the exterior surface of said end portion, said radial ridge originating at the intersection of said shoulder with said end portion; a radially contractable collet for receiving said tube surrounding said end portion in substantially concentric spaced relation thereto, said collet being provided with a frusto-conical outer surface over a portion of its length with the larger diameter end in assembly abutting against said nipple shoulder portion, longitudinal slots extending from said larger diameter end to define a plurality of fingers on said collet, said collet also being provided with a ridge portion disposed in a radial array and projecting inwardly from the interior surface of each finger of said collet, said collet ridge portions sloping from the end of the collet at an angle not greater than 75°; the minimum separation between the ridge portions of said collet and said nipple end portion ridge being directly opposite each other in confronting relationship and contacting said tube; said nipple end portion ridge being provided with a side opposite said nipple shoulder portion sloping toward said shoulder portion at an acute angle between 55°–75° in size and forming with said nipple shoulder portion and said collet ridge portion a compartment for trapping said tube; a clamping ring disposed about said collet having an interior frusto-conical surface adapted to engage the exterior frusto-conical surface of said collet and contract said collet radially inwardly upon axial movement of said clamping ring toward the large diameter end of said collet, the minimum distance between said nipple end portion ridge and said ridge portions of the collet being less than the thickness of said tube; and means for advancing said clamping ring in an axial direction toward the large diameter end of said collet; said nipple end portion ridge having a surface opposite from said sloping nipple portion, said surface being at approximately right angles with the longitudinal axes of said bore and said tube to form a substantially sawtooth shaped nipple end portion ridge, whereby said tube is penetrated by the nipple end portion ridge and compressed by said collet ridge portions, causing the tube material to be trapped within said compartment and resulting in the attainment of high pressure at the interface between the tube material and said slanted side.

2. The assembly according to claim 1 wherein said means for advancing said clamping ring comprises a cap element having a flange portion adapted to bear against said clamping ring, there being a threaded connection between said cap element and said nipple.

3. The assembly according to claim 2, wherein said ridge portions are triangular in cross section.

4. The assembly according to claim 3, wherein said collet ridge portions have slanted sides opposite said shoulder portion sloping towards said shoulder portion at an acute angle between 55°–75° in size.

5. The assembly according to claim 4 wherein each of said collet ridge portions has a second slanted side forming an apex with said first slanted side to allow for easy removal during disassembly.

References Cited by the Examiner

UNITED STATES PATENTS

| 2,025,427 | 12/35 | Weatherhead | 285—258 X |
| 2,289,382 | 7/42 | Parker | 285—334.5 X |
| 2,470,508 | 5/49 | Maky | 285—382 X |
| 2,850,303 | 9/58 | Bauer | 285—382 X |
| 2,878,039 | 3/59 | Hoegee | 285—249 |
| 3,139,293 | 6/64 | Franck. | |

CARL W. TOMLIN, *Primary Examiner.*

THOMAS F. CALLAGHAN, *Examiner.*